United States Patent
Ahn et al.

(10) Patent No.: US 7,133,195 B2
(45) Date of Patent: Nov. 7, 2006

(54) GAIN-CLAMPED FIBER AMPLIFIER

(75) Inventors: Joon Tae Ahn, Daejeon (KR); Hong Seok Seo, Daejeon (KR); Woon Jin Chung, Seoul (KR); Bong Je Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 11/135,286

(22) Filed: May 24, 2005

(65) Prior Publication Data

US 2006/0126164 A1    Jun. 15, 2006

(30) Foreign Application Priority Data

Dec. 9, 2004    (KR) ............... 10-2004-0103683

(51) Int. Cl.
H04B 10/17    (2006.01)
(52) U.S. Cl. .................................... 359/337.4
(58) Field of Classification Search ............ 359/341.1, 359/341.4, 337.4
See application file for complete search history.

(56) References Cited

U.S. PATENT DOCUMENTS

| | | | |
|---|---|---|---|
| 5,050,183 A * | 9/1991 | Duling, III .................... | 372/94 |
| 5,128,800 A * | 7/1992 | Zirngibl .................... | 359/341.4 |
| 5,991,068 A | 11/1999 | Massicott et al. | |
| 6,307,670 B1 | 10/2001 | McNamara | |
| 6,441,953 B1 * | 8/2002 | Cowle et al. ............ | 359/341.3 |
| 6,853,658 B1 * | 2/2005 | DiJaili et al. .............. | 372/38.1 |
| 2004/0114214 A1 * | 6/2004 | Hwang et al. ........... | 359/341.3 |

FOREIGN PATENT DOCUMENTS

| | | |
|---|---|---|
| KR | 1997-0048685 | 3/1999 |
| WO | WO 99/50938 | 10/1999 |

OTHER PUBLICATIONS

Xiao, et al.; "A Novel Compensating Light Injection Configuration for Gain-Clamped EDFA's": IEEE Photonics Technology Letters; Jul. 2000; vol. 12, No. 7; pp. 789-791.
Srivastava, et al.; "Fast-Link Control Protection of Surviving Channels in Multiwavelength Optical Networks"; IEEE Photonics Technology Letters; Dec. 1997; vol. 9, No. 12; pp. 1667-1669.
Desurvire, et al.; "Dynamic Gain Compensation in Saturated Erbium-Doped Fiber Amplifiers"; IEEE Photonics Technology Letters; May 1991; vol. 3, No. 5; pp. 453-455.
Luo, et al.; "Experimental and Theoretical Analysis of Relaxation-Oscillations and Spectral Hole Burning Effects in All-Optical Gain-Clamped EDFA's for WDM Networks"; IEEE Journal of Lightwave Technology; Apr. 1998; vol. 16, No. 4; pp. 527-533.
Ahn, et al.; "All-Optical Gain-Clamped Erbium-Doped Fiber Amplifier With Improved Noise Figure and Freedom From Relaxation Oscillation"; IEEE Photonics Technology Letters; Jan. 2004; vol. 16, No. 1; pp. 84-86.

* cited by examiner

*Primary Examiner*—Jack Keith
*Assistant Examiner*—Ari M Diacou
(74) *Attorney, Agent, or Firm*—Mayer, Brown, Rowe & Maw LLP

(57) ABSTRACT

Provided is a gain-clamped fiber amplifier for amplifying the magnitude of an input optical signal in an optical communication system. The gain-clamped fiber amplifier includes a first amplifier for amplifying a predetermined optical signal and a second amplifier for compensating for a noise figure characteristic of the first amplifier and for separating remaining pumping light whose intensity changes in accordance with an optical signal. Therefore, it is possible to improve the noise figure and dynamic range characteristics and the performance of the amplifier.

10 Claims, 2 Drawing Sheets

GAIN-CLAMPED FIBER AMPLIFIER

CROSS-REFERENCE TO RELATED APPLICATION

This application claims priority to and the benefit of Korean Patent Application No. 2004-103683, filed Dec. 9, 2004, the disclosure of which is incorporated herein by reference in its entirety.

BACKGROUND

1. Field of the Invention

The present invention relates to a fiber amplifier for amplifying the magnitude of an input optical signal in an optical communication system, and more particularly, to a gain-clamped optical amplifier having uniform gain characteristics in spite of change in the magnitude of the input optical signal.

2. Discussion of Related Art

In general, an optical amplifier such as a semiconductor optical amplifier and a fiber amplifier is an optical device for amplifying the magnitude of an optical signal which must be used in order to compensate for optical loss generated in optical fiber for transmission or various optical devices in the fields of optical transmission and optical network.

However, according to the conventional optical amplifier, the degree of amplification varies with the magnitude of an input optical signal, such that communication quality deteriorates in the optical network. Therefore, in order to solve the problem, a gain-clamped fiber amplifier has been developed.

An all-optical gain-clamped fiber amplifier of optically clamping gain using laser resonance does not need a complicated signal processing process for clamping gain. When loss and gain generated by a cavity are the same, laser oscillation occurs. When the laser oscillation occurs, the magnitude of the population inversion of a gain medium is fixed.

Since the gain of the fiber amplifier is proportional to the magnitude of the population inversion and the length of the gain medium, when the laser oscillation occurs, the gain of the amplifier is clamped. When an optical signal is input to the fiber amplifier whose gain is clamped due to the laser oscillation, gain is maintained uniform regardless of the magnitude of the optical signal when the input optical signal is weak, and the laser oscillation stops and the gain-clamped characteristic of the fiber amplifier disappears when the magnitude of the input optical signal increases.

FIG. 1 illustrates an example of the conventional gain-clamped fiber amplifier that uses the laser oscillation.

Referring to FIG. 1, when optical fiber is used as a gain medium 1, pumping light is supplied from a laser diode (LD) 3 through a wavelength division multiplexed (WDM) optical coupler 2. An optical attenuator (ATT) 5, optical isolators (ISO) 6, and a backlit optical filter (BPF) 7 form a ring cavity for the laser oscillation by optical couplers 4 of input and output stages.

The backlit optical filter 7 controls the wavelength at which the laser oscillation occurs. The optical isolators 6 let oscillation performed in one direction in the ring cavity. The optical attenuator 5 controls the optical loss of the cavity to control the gain of the amplifier.

In the fiber amplifier structured as illustrated in FIG. 1, the magnitude of an input optical signal and the magnitude of a laser optical signal that oscillates inside are complementary to each other. That is, the magnitude of the laser oscillation light increases when the magnitude of the input optical signal is weak and the magnitude of the laser oscillation light is reduced when the magnitude of the input optical signal increases such that amplification ratio is maintained uniform even if the magnitude of the input optical signal changes to some extent. At this time, when the magnitude of the input optical signal increases to no less than a uniform level, the laser oscillation stops and the gain of the fiber amplifier is reduced like the gain of a common fiber amplifier.

However, according to a gain-clamped fiber amplifier that uses the laser oscillation, when the magnitude of the input optical signal changes, the magnitude of the amplified optical signal temporarily fluctuates due to relaxation oscillation due to the laser cavity. Temporary change in the magnitude of the optical signal affects the bit error rate of transmitted data. Also, since a relaxation oscillation frequency is determined in accordance with the characteristic of the gain medium and the length of the cavity, it is difficult to manufacture the fiber amplifier and light transmission speed and optical signal processing speed are restricted.

SUMMARY OF THE INVENTION

The present invention is directed to implementation of an all-optical gain-clamped fiber amplifier of a control light method capable of controlling the magnitude of control light by an all-optical method without electronic signal processing and having a low noise figure characteristic.

In order to achieve the above object, one aspect of the present invention is to provide a gain-clamped fiber amplifier comprising: a first amplifier for amplifying a predetermined optical signal; and a second amplifier for compensating for the noise figure characteristic of the first amplifier and for separating remaining pumping light whose intensity changes in accordance with an optical signal.

Here, the gain-clamped fiber amplifier may include a fiber laser connected between the first amplifier and the second amplifier to receive the remaining pumping light separated by the second amplifier such that the remaining pumping light is used as a pumping light source and oscillated at a predetermined wavelength to be used as the control light of the first amplifier.

The oscillation wavelength and the output of the fiber laser may be controlled such that the wavelength and the intensity of the control light are changed.

The gain-clamped fiber amplifier may further include a fiber amplifier connected between the first amplifier and the second amplifier to receive remaining pumping light separated by the second amplifier such that the remaining pumping light is used as a pumping light source, the fiber amplifier for receiving control light having a predetermined wavelength from the outside, for amplifying the control light, and for outputting the amplified control light to the first amplifier.

The gain of the fiber amplifier may be controlled such that the intensity of the control light is changed.

The first amplifier and the second amplifier may include a gain medium for amplifying the optical signal, a light source for providing predetermined pumping light for the population inversion of the gain medium, and an optical coupler for coupling the pumping light with the gain medium.

BRIEF DESCRIPTION OF THE DRAWINGS

The above and other features and advantages of the present invention will become more apparent to those of ordinary skill in the art by describing in detail preferred embodiments thereof with reference to the attached drawings in which.

DETAILED DESCRIPTION OF PREFERRED EMBODIMENTS

Hereinafter, an exemplary embodiment of the present invention will be described in detail. However, the present invention is not limited to the embodiments disclosed below, but can be implemented in various types. Therefore, the present embodiment is provided for complete disclosure of the present invention and to fully inform the scope of the present invention to those ordinarily skilled in the art.

Figure 1:
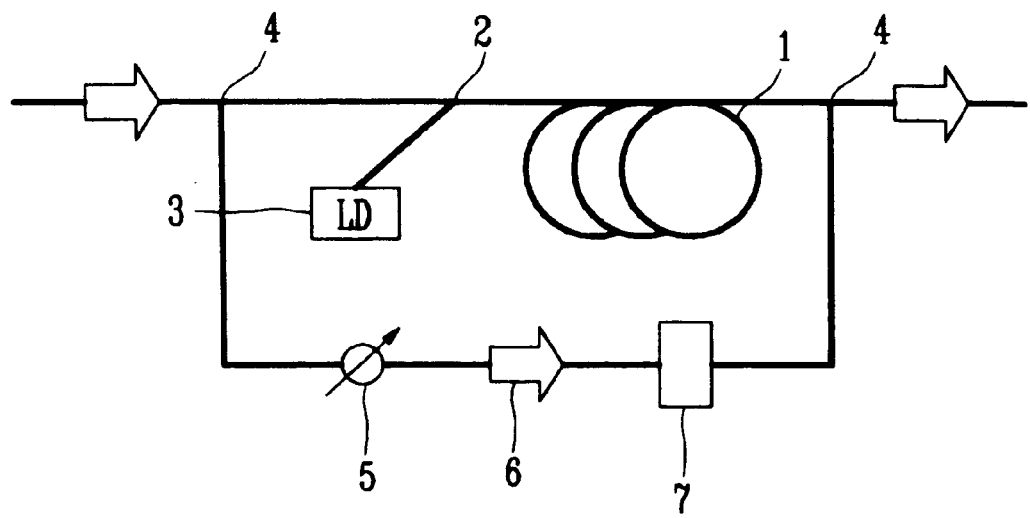
FIG. 1 is a schematic view illustrating a conventional gain-clamped Erbium-doped fiber amplifier using laser oscillation.
Figure 2A:
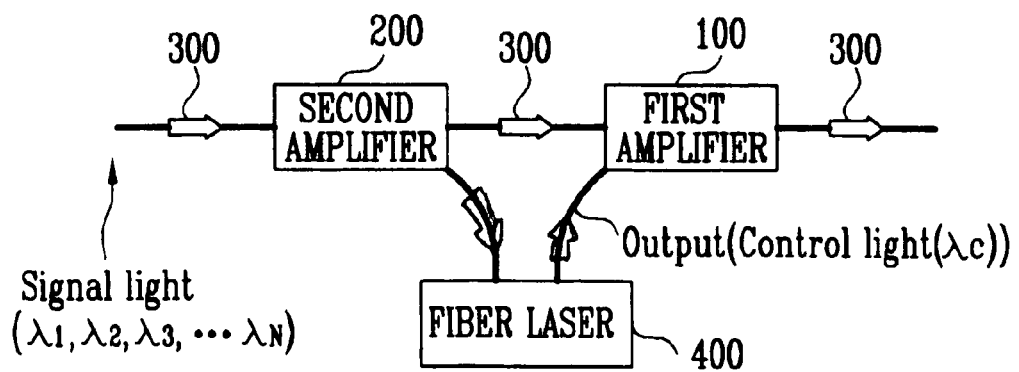
FIGS. 2A and 2B are schematic views illustrating a gain-clamped fiber amplifier according to a first embodiment of the present invention.
Figure 2B:
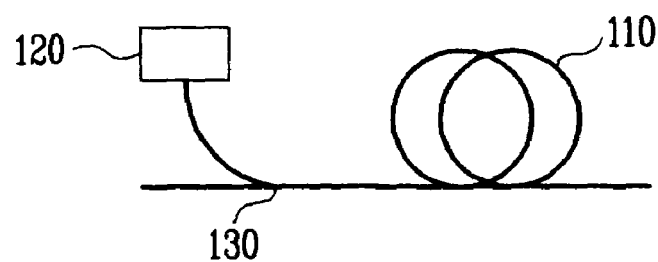

FIGS. 2A and 2B are schematic views illustrating a gain-clamped fiber amplifier according to a first embodiment of the present invention. FIG. 2A is a block diagram illustrating the gain-clamped fiber amplifier according to the first embodiment of the present invention. FIG. 2B is a block diagram illustrating the first amplifier and the second amplifier of FIG. 2A in detail.

Referring to FIGS. 2A and 2B, the gain-clamped fiber amplifier according to the first embodiment of the present invention has a two-stage amplification structure in which an optical isolator 300 is mounted in each of the input and output stages of a first amplifier 100 and a second amplifier 200 such that the optical isolators mounted in the input and output stages of the first amplifier 100 and the second amplifier 200 are connected to each other. The gain-clamped fiber amplifier includes a fiber laser 400 connected between the first amplifier 100 and the second amplifier 200 to generate control light.

Here, the first amplifier 100 as a main amplifier amplifies a predetermined input optical signal. The second amplifier 200 as a sub-amplifier compensates for the noise figure characteristic of the first amplifier 100 and separates residual pumping light whose magnitude changes in accordance with the optical signal.

Each of the first amplifier 100 and the second amplifier 200 includes a gain medium 110 for amplifying a predetermined input optical signal, a light pumping light source 120 for providing predetermined pumping light for the population inversion of the gain medium 110, and an optical coupler 130 for coupling the pumping light with the gain medium 110.

At this time, the gain medium 110 is made of one among Erbium-doped fiber (EDF), Nd-doped fiber (NDF), rare earth ion-doped optical fiber, a Raman fiber amplifier, and a semiconductor optical amplifier (SOA).

The optical coupler 130 is preferably realized by a wavelength division multiplexed (WDM) optical device.

The optical isolators 300 transmit the light that travels in one direction of the input stage and the output stage and absorb the light that travels in the inverse direction to the input stage and the output stage.

The fiber laser 400 is preferably formed of one among a Fabry-Perot cavity, a ring cavity, and 8-shaped ring cavity.

On the other hand, in the first amplifier 100 and the second amplifier 200, in order to obtain required amplification characteristics, the conditions of pumping light such as outputs, wavelengths, and pumping directions and the length of the EDF may properly change.

Since the first amplifier 100 as the main amplifier amplifies the input optical signal, in order to obtain the optical amplification characteristics of high output and gain, the larger the pumping light output, the better. Also, bi-directional optical pumping structure can be selected. For example, the length of the EDF is commonly about several tens meters.

In order to reduce the noise figure of the gain-clamped fiber amplifier according to the first embodiment of the present invention having the above-described structure, the population inversion of the input portion of the amplifier must be maintained high. Therefore, the EDF much shorter than the first amplifier 100 as the main amplifier is preferably used as the second amplifier 200 as the sub-amplifier corresponding to the former half of the gain-clamped fiber amplifier according to the first embodiment of the present invention.

Also, in order to improve the dynamic range characteristic of the gain-clamped fiber amplifier according to the first embodiment of the present invention, it is preferable to use short EDF and intensive pumping light.

When input optical signals $\lambda 1, \lambda 2, \lambda 3, \ldots,$ and $\lambda_N$ are incident on the second amplifier 200 having such conditions, it is possible to obtain uniform gain almost regardless of wavelength and the intensity of remaining pumping light varies with the number of wavelength channels of the input optical signals.

That is, when the number of wavelength channels is small, the intensity of the remaining pumping light is large. Meanwhile, when the number of wavelength channels is large, the intensity of the remaining pumping light is small. The signal light amplified while passing through the optical coupler 130, for example, the WDM optical device in the output stage of the second amplifier 200 is incident on the first amplifier 100 and the remaining pumping light is separated.

The separated remaining pumping light is used as the pumping light source of the fiber laser 400. When the fiber laser 400 is oscillated at the wavelength of $\lambda_C$, the output of the fiber laser 400 may be used as the control light of the first amplifier 100.

The intensity of the output light of the fiber laser 400 increases or is reduced in proportion to the intensity of the pumping light. That is, when the intensity of the input signal light incident on the gain-clamped fiber amplifier according to the first embodiment of the present invention is large, the intensity of the remaining pumping light is small. Therefore, the intensity of the control light generated by the fiber laser 400 is also small.

On the other hand, when the intensity of the input signal light is small, the intensity of the remaining pumping light is large. Therefore, the intensity of the control light generated by the fiber laser 400 is also large. As described above, the intensity of the control light changes in the all-optical method without electronic signal process in accordance with change in the intensity of the input signal light. Therefore, it is possible to realize an all-optical gain-clamped fiber amplifier of a control light method in which the noise figure characteristic is improved.

On the other hand, it is possible to control the length of the gain medium 110 and the magnitude of pumping energy such that the noise figure and dynamic range characteristics are optimized.

Figure 3A:
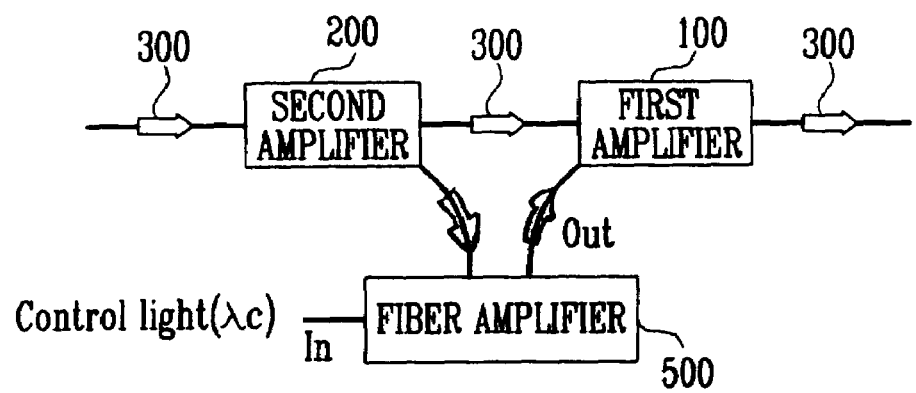
FIGS. 3A and 3B are schematic views illustrating a gain-clamped fiber amplifier according to a second embodiment of the present invention.
Figure 3B:
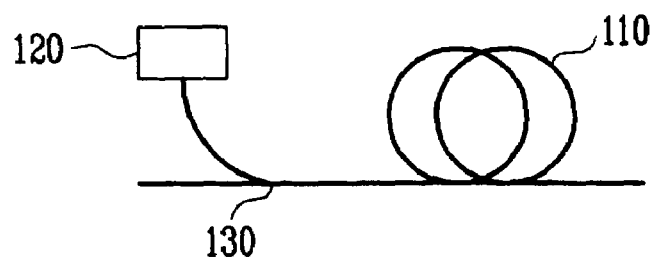

FIGS. 3A and 3B are schematic views illustrating the gain-clamped fiber amplifier according to the second embodiment of the present invention. FIG. 3A is a block diagram illustrating the gain-clamped fiber amplifier according to the second embodiment of the present invention. FIG. 3B is a block diagram illustrating the first amplifier and the second amplifier of FIG. 3A.

Referring to FIGS. 3A and 3B, the gain-clamped fiber amplifier according to the second embodiment of the present invention has a two-stage amplification structure in which an optical isolator 300 is mounted in each of the input and output stages of a first amplifier 100 and a second amplifier 200 such that the optical isolators mounted in the input and output stages of the first amplifier 100 and the second amplifier 200 are connected to each other. The gain-clamped fiber amplifier includes a fiber amplifier 500 connected between the first amplifier 100 and the second amplifier 200 to generate control light.

Here, since the structures of the first amplifier 100, the second amplifier 200, and the optical isolators 300 are the same as illustrated in the first embodiment of the present invention, detailed description thereof will be omitted.

In particular, the fiber amplifier 500 according to the second embodiment of the present invention is connected between the first amplifier 100 and the second amplifier 200, receives the remaining pumping light separated by the second amplifier 200 such that the remaining pumping light is used as a pumping light source, receives control light having a predetermined wavelength $\lambda_C$ from the outside, amplifies the control light, and outputs the amplified control light to the first amplifier 100. The gain of the fiber amplifier 500 is controlled such that the intensity of the control light $\lambda_C$ is changed.

In order to reduce the noise figure of the gain-clamped fiber amplifier according to the second embodiment of the present invention having the above-described structure, the population inversion of the input of the amplifier must be maintained high. Therefore, the EDF much shorter than the first amplifier 100 as the main amplifier is preferably used as the second amplifier 200 as the sub-amplifier corresponding to the former half of the gain-clamped fiber amplifier according to the second embodiment of the present invention.

Also, in order to improve the dynamic range characteristic of the gain-clamped fiber amplifier according to the second embodiment of the present invention, it is preferable to use short EDF and intensive pumping light.

When input optical signals $\lambda 1, \lambda 2, \lambda 3, \ldots,$ and $\lambda_N$ are incident on the second amplifier 200 having such conditions, it is possible to obtain uniform gain almost regardless of wavelength and the intensity of remaining pumping light varies with the number of wavelength channels of the input optical signals.

That is, when the number of wavelength channels is small, the intensity of the remaining pumping light is large. Meanwhile, when the number of wavelength channels is large, the intensity of the remaining pumping light is small. The signal light amplified while passing through the optical coupler 130, for example, the WDM optical device in the output stage of the second amplifier 200 is incident on the first amplifier 100 and the remaining pumping light is separated.

The separated remaining pumping light is used as the pumping light source of the fiber amplifier 500 for amplifying the control light. For example, the control light whose wavelength is $\lambda_C$ is incident on the fiber amplifier 500, is amplified, and is incident on the first amplifier 100.

The intensity of the output light of the fiber amplifier 500 increases or is reduced in proportion to the intensity of the pumping light. That is, when the intensity of the input signal light incident on the gain-clamped fiber amplifier according to the second embodiment of the present invention is large, the intensity of the remaining pumping light is small. Therefore, the intensity of the control light generated by the fiber amplifier 500 is also small.

On the other hand, when the intensity of the input signal light is small, the intensity of the remaining pumping light is large. Therefore, the intensity of the control light generated by the fiber amplifier 500 is also large. As described above, the intensity of the control light changes in the all-optical method without electronic signal process in accordance with change in the intensity of the input signal light. Therefore, it is possible to realize an all-optical gain-clamped fiber amplifier of a control light method in which the noise figure characteristic is improved.

While the invention has been shown and described with reference to certain exemplary embodiments thereof, it will be understood by those skilled in the art that various changes in form and details may be made therein without departing from the spirit and scope of the invention as defined by the appended claims.

The gain-clamped fiber amplifier according to the present invention has the two-stage amplification structure in which the second amplifier as the sub-amplifier is provided in the front stage of the first amplifier as the main amplifier and the optical isolator is mounted in each of the input and output stages of the first amplifier and the second amplifier such that the optical isolators mounted in the input and output stages of the first amplifier and the second amplifier are connected to each other. Therefore, it is possible to control the intensity of the control light by the all-optical method without electronic signal processing, to improve the noise figure and dynamic range characteristics and the performance of the amplifier.

What is claimed is:

1. A gain-clamped fiber amplifier comprising:
    a first amplifier configured to amplify a predetermined optical signal;
    a second amplifier configured to compensate for a noise figure characteristic of the first amplifier and for separating remaining pumping light whose intensity changes in accordance with an optical signal; and
    a fiber laser connected between and to both of the first amplifier and the second amplifier;
    wherein the fiber laser is configured to receive the remaining pumping light separated by a second amplifier such that the remaining pumping light is used as a pumping light source and oscillated at a predetermined wavelength to be used as control light of the first amplifier.

2. The gain-clamped fiber amplifier according to claim 1, wherein the oscillation wavelength and the output of the fiber laser are controlled such that the wavelength and intensity of the controlled light are changed.

3. The gain-clamped fiber amplifier according to claim 1, wherein the fiber laser is formed of one selected from a Fabry-Perot cavity, a ring cavity, and an 8-shaped ring cavity.

4. The gain-clamped fiber amplifier according to claim 1, further comprising a fiber amplifier to receive remaining pumping light separated by the second amplifier such that the remaining pumping light is used as a pumping light source, the fiber amplifier is configured to receive control light having a predetermined wavelength from the outside, configured to amplify the received control light, and for outputting the amplified control light to the first amplifier.

5. The gain-clamped fiber amplifier according to claim 4, wherein the gain of the fiber amplifier is controlled such that the intensity of the control light is changed.

6. The gain-clamped fiber amplifier according to claim 1, wherein the input and output stages of the first amplifier and the second amplifier are connected to each other by optical isolators.

7. The gain-clamped fiber amplifier according to claim 1, wherein the first amplifier and the second amplifier comprise:
  a gain medium configured to amplify the optical signal;
  a light source configured to provide predetermined pumping light for the population inversion of the gain medium; and
  an optical coupler configured to couple the pumping light with the gain medium.

8. The gain-clamped fiber amplifier according to claim 7, wherein a length of the gain medium and a magnitude of pumping energy are controlled such that the gain and noise figure and dynamic range characteristics of the amplifier are optimized.

9. The gain-clamped fiber amplifier according to claim 7, wherein the gain medium is formed of one selected from the group consisting of Erbium-doped fiber (EDF), Nd-doped fiber (NDF), rare earth ion-doped optical fiber, a Raman fiber amplifier, and a semiconductor optical amplifier (SOA).

10. The gain-clamped fiber amplifier according to claim 7, wherein the optical coupler is a wavelength division multiplexed (WDM) optical device.

* * * * *